(12) United States Patent
Rayment et al.

(10) Patent No.: US 8,813,771 B2
(45) Date of Patent: Aug. 26, 2014

(54) GATE VALVE

(75) Inventors: Stephen E. Rayment, Lions Bay (CA); Simon A. R. Copeland, Langley (CA)

(73) Assignee: Quantum Supply Ltd., West Vancouver (CA)

( * ) Notice: Subject to any disclaimer, the term of this patent is extended or adjusted under 35 U.S.C. 154(b) by 334 days.

(21) Appl. No.: 13/492,543

(22) Filed: Jun. 8, 2012

(65) Prior Publication Data

US 2013/0001456 A1 Jan. 3, 2013

Related U.S. Application Data

(60) Provisional application No. 61/494,695, filed on Jun. 8, 2011.

(51) Int. Cl.
*F16K 3/30* (2006.01)
*F16K 25/00* (2006.01)

(52) U.S. Cl.
CPC .. *F16K 3/30* (2013.01); *F16K 25/00* (2013.01)
USPC ......... 137/15.23; 251/327; 251/328; 251/363

(58) Field of Classification Search
USPC ................. 251/172, 174, 326–329, 359–363; 277/530, 647; 137/15.23
See application file for complete search history.

(56) References Cited

U.S. PATENT DOCUMENTS

| | | | | | |
|---|---|---|---|---|---|
| 3,189,319 | A | * | 6/1965 | Bredtschneider | 251/328 |
| 3,269,695 | A | * | 8/1966 | Grove | 251/174 |
| 3,285,565 | A | * | 11/1966 | Barnier et al. | 251/328 |
| 3,689,028 | A | * | 9/1972 | Dickenson et al. | 251/328 |
| 4,221,307 | A | * | 9/1980 | Peterson | 251/327 |
| 4,625,942 | A | * | 12/1986 | Nelson | 251/327 |
| 4,741,509 | A | * | 5/1988 | Bunch et al. | 251/172 |
| 4,895,181 | A | * | 1/1990 | McKavanagh | 251/327 |
| 4,938,250 | A | * | 7/1990 | Peterson | 251/328 |
| 4,973,067 | A | * | 11/1990 | Fritz | 251/328 |
| 5,330,158 | A | * | 7/1994 | Ellich et al. | 251/327 |
| 5,909,867 | A | * | 6/1999 | Blecha | 251/328 |
| 7,325,783 | B2 | * | 2/2008 | Hunter | 251/328 |

\* cited by examiner

*Primary Examiner* — John Bastianelli
(74) *Attorney, Agent, or Firm* — Oyen Wiggs Green & Mutala LLP

(57) ABSTRACT

A gate valve for controlling the flow of pressurized fluid having a dynamically-energized seal between a seat ring and a valve body. The dynamically-energized seal may be located in an annular groove defined in a flange sealing face of the seat ring to seal against an annular shoulder sealing face of the valve body. A plurality of fasteners may bring the flange sealing face of the seat ring to a mechanical stop against the shoulder sealing face of the valve body and dynamically energize the dynamically-energized seal. An obturator may engage and disengage the seat ring to control flow through the gate valve.

25 Claims, 7 Drawing Sheets

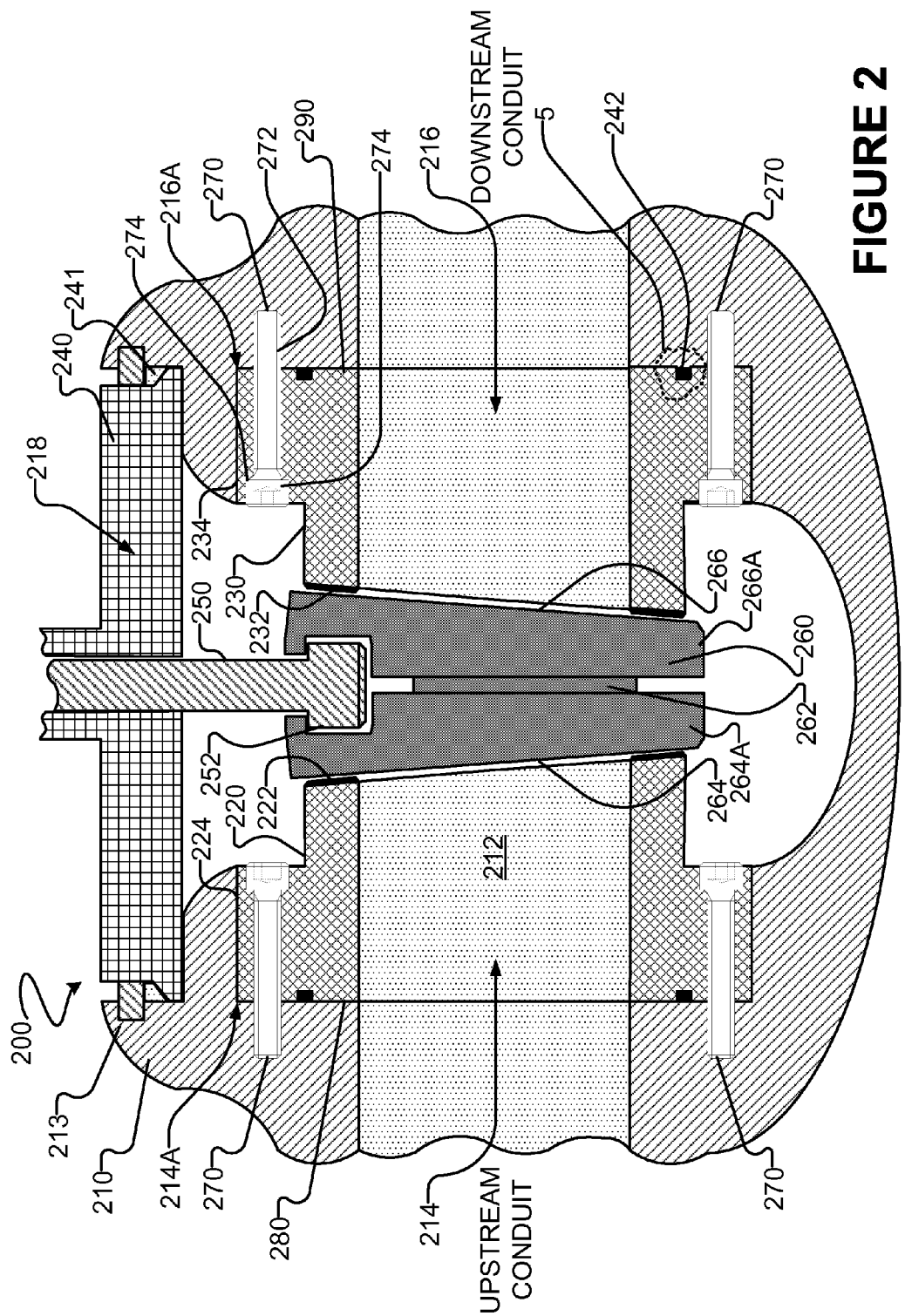

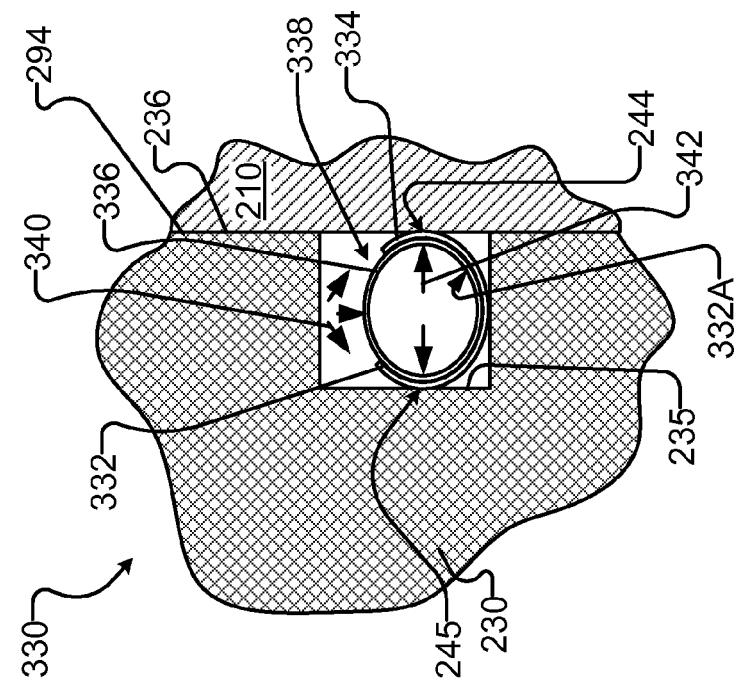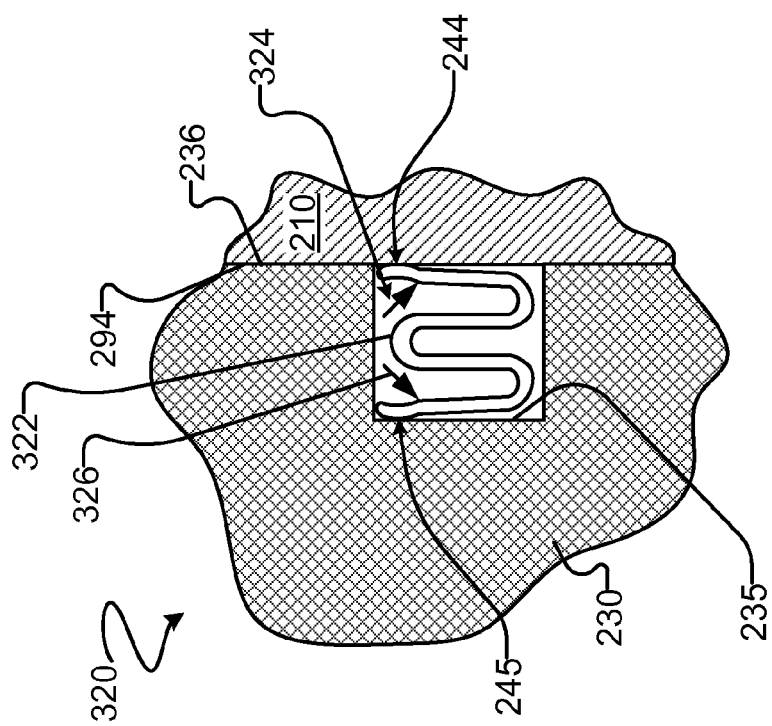

US 8,813,771 B2

GATE VALVE

RELATED APPLICATIONS

This application claims the benefit of the priority date of U.S. application No. 61/494,695 filed 8 Jun. 2011 which is hereby incorporated herein by reference.

TECHNICAL FIELD

The invention relates to valves for selectively conducting fluids under pressure. Embodiments of the invention provide valves having removable seat elements.

BACKGROUND

Gate valves may be used to control the flow of fluid in conduits. Some applications where gate valves are used are characterized by high temperatures (e.g. in excess of 350° C.) and/or pressures (e.g. in excess of 15,000 kPa). The pressure and temperature ratings of gate valves are typically characterized by the American Society of Mechanical Engineers (ASME) or other similar nationally or internationally recognized institutions. Specifically, the standard ASME B16.34 covers valves—flanged, threaded and welded end—and specified allowable maximum pressures and temperatures. Relatively recently, gate valves have been constructed with relatively large cross-sectional sizes (e.g. in excess of 20 inches in diameter) and to pressure and temperature ratings according to ASME B16.34 Class 600 and higher. Non-limiting examples of applications where such gate valves are used include steam assisted gravity drain (SAGD) oil extraction, hydrocarbon or other chemical processing, steam turbine power generation, steam generation and/or processing applications, other steam-based applications and/or the like.

FIG. 1 shows a partial cross-section view of a prior art gate valve 100 of the type currently used for applications characterized by high temperatures and pressures (e.g. ASME B16.34 Class 600 or higher). Valve 100 comprises a valve body 110 which defines a flow passageway 112 between an inlet port 114 and an outlet port 116. Valve 100 is typically installed along a conduit, connected at inlet port 114 to an upstream conduit and at outlet port 116 to a downstream conduit.

A first seat ring 120 is installed at inlet port 114. A second seat ring 130 is installed at outlet port 116. Seat rings 120, 130 respectively comprise seat faces 122, 132. Where high temperatures and/or pressures preclude or otherwise make it inconvenient to use elastomer gaskets, seat rings 120, 130 are respectively secured in ports 114, 116 using annular welds 124, 134. A stem 150 is movable to drive obturator 160 against seat rings 120, 130. In the illustrated gate valve 100, stem 150 may be lowered to respectively press the outward faces 164, 166 of obturator 160 against faces 122, 132 of seat rings 120, 130 (i.e. closing valve 100) and stem 150 may be raised to move outward faces 164, 166 of obturator 160 away from faces 122, 132 of seat rings 120, 130 (i.e. opening valve 100). Because of the shape of obturator 160, valve 100 may be referred to as a wedge-gate valve.

In use of valve 100, seat faces 122, 132 may become worn or the quality of seat faces 122, 132 may otherwise deteriorate. By way of non-limiting example, such wear and/or quality deterioration may occur due to friction with obturator 160, debris in fluid passing through valve 100, corrosion, and/or the like. Worn or otherwise degraded seat faces 122, 132 are associated with poor sealing between obturator 160 and seat rings 120, 130. Such poor seals can cause valve 100 to leak, to function inefficiently and/or to cease functioning at an acceptable level or altogether. Such poor seals can cause also cause further damage to valve 100 (e.g. further degradation of seat faces 122, 132 or the like) and/or to other parts of the system (not shown) in which valve 100 is operating.

Servicing prior art valve 100 (e.g. because of worn or otherwise degraded seat faces 122, 132) typically involves removing valve 100 from the conduit and either replacing valve 100 or transporting valve 100 to a suitable location (e.g. a machine shop) for servicing. Once valve 100 is removed from the conduit and transported to a service location, servicing valve 100 may involve cutting welds 124, 134 to facilitate the removal of seat rings 120, 130, removing seat rings 120, 130 from valve 100 and either replacing seat rings 120, 130 with new seat rings or resurfacing seat faces 122, 132 using suitable machining techniques (e.g. grinding). Because of this process, servicing prior art valve 100 (e.g. because of worn or otherwise degraded seat faces 122, 132) can be time consuming, costly and dangerous. Moreover, the system in which valve 100 operates has to be shut down while valve 100 is being services which can exacerbate the costs associated with servicing valve 100.

U.S. Pat. No. 3,175,802 and U.S. Pat. No. 3,689,028 purport to describe valve assemblies having removable seat rings. These valve assemblies are not suitable for services in valves having large cross-sectional area (e.g. greater than 20 inches in diameter) and/or in pressure and temperatures designated by ASME B16.34 as class 600 or higher.

There is a general desire for valves and/or seat rings wherein the seat rings are easily removed from the valves and new or refurbished seat rings are easily replaced into the valves in situ (e.g. without disconnecting the valve bodies from their associated upstream or downstream conduits) and corresponding methods for in situ removal of seat rings from, and replacement of seat rings into, valves. There is a further desire for such valves, seat rings and methods to have application in high temperature and/or high pressure environments.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a gate valve for controlling flow of pressurized operating fluid. The gate valve comprises: a valve body having a seat pocket, the seat pocket having an annular shoulder sealing face; an annular seat ring having on opposite sides an annular seat face and annular flange sealing face, the flange sealing face having an annular groove defined thereon; a plurality of fasteners configured to bring the flange sealing face of the seat ring to a mechanical stop on the shoulder sealing face of the seat pocket; and a dynamically-energized seal located in the annular groove, the dynamically-energized seal configured to be plastically and elastically compressed by a seating load between the seat ring and the valve body when the flange sealing face of the seat ring has reached mechanical stop on the shoulder sealing face of the seat pocket.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

FIG. 2 shows a cross-sectional view of a gate valve according to an example embodiment.

FIGS. 7-10 show partial cross-sectional views of valves according to other example embodiments incorporating different types of dynamically-energized metal seals.

DESCRIPTION

Figure 1:
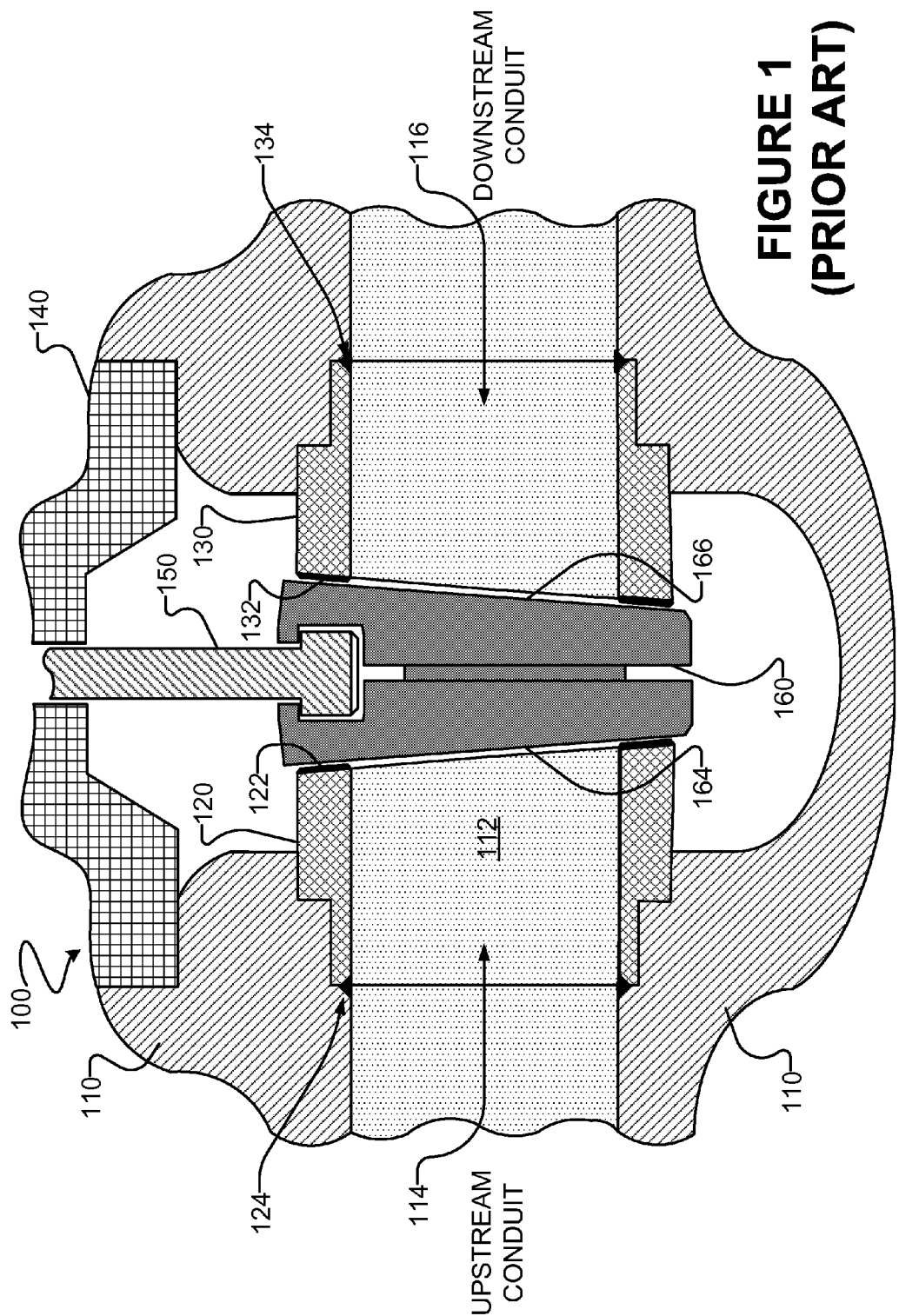
FIG. 1 shows a cross-sectional view of a prior art gate valve.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

FIG. 2 shows a partial cross-section view of a valve 200 according to an example embodiment of the invention. Valve 200 of the illustrated embodiment is a gate valve. More particularly, valve 200 of the illustrated embodiment is a torque-seated, wedge-gate valve, but this is not necessary. Valve 200 comprises a valve body 210 which provides a flow passageway 212 between an inlet port 214 and an outlet port 216. Inlet port 214 may be connected to an upstream conduit and outlet port 216 may be connected to a downstream conduit. In the illustrated embodiment, where valve 200 is a gate valve, valve body 210 also comprises a neck 213 which extends away from flow passageway 212.

Valve 200 includes a first seat ring 220 installed at inlet port 214 and a second seat ring 230 installed at outlet port 216. Seat rings 220, 230 respectively comprise annular seat faces 222, 232. In the illustrated embodiment, where valve 200 is a wedge gate valve, annular seat faces 222, 232 may be bevelled to mate with correspondingly bevelled surfaces 264, 266 of wedge-shaped obturator (gate) 260 (explained in more detail below). Typical bevel angles for seat faces 222, 232 are in a range of 3-10°. When seat rings 220, 230 are installed in valve 200, seat faces 222, 232 are in spaced opposition to one another, seat faces 222, 232 encircle (or otherwise extend around) flow passageway 212, and seat rings 220, 230, seat faces 222, 232 and inlet and outlet ports 214, 216 may be co-axial.

Neck 213 of valve body 210 defines an access aperture 218 which may be sealed by a removable bonnet 240. In the illustrated embodiment, valve 200 comprises a so-called pressure seal bonnet 240 which is characterized by the feature that increased process pressure (i.e. increased pressure of fluid located in or moving through flow passageway 212) causes increased pressure of bonnet 240 on seal(s) 241 and a correspondingly stronger seal between bonnet 240 and valve body 210. Pressure seal bonnet 240 of the illustrated embodiment is suitable for high temperature and/or pressure applications (e.g. ASME B16.34 Class 600 and higher). However, in other embodiments (e.g. for applications at pressures and/or temperatures below ASME B16.34 Class 600), valves may comprise so called bolted bonnets where the bonnet is bolted to the valve body. Valves comprising bolted bonnets may be used for lower temperature and/or pressure applications and/or applications where abrasion is an issue—e.g. where sand or other debris is entrapped in the fluid being conducted by the valve.

A stem 250 extends through bonnet 240 and neck 213 of valve body, intersecting flow passageway 212. An obturator (gate) 260 is coupled to a hub 252 located at an interior end of stem 250. In the illustrated embodiment, obturator 260 is wedge-shaped to provide beveled surfaces 264, 266. Stem 250 is axially positionable within neck 213 of valve body 210 to move obturator 260 between an open position and a closed position. Stem 250 may be moved in this manner by any of a variety of manual or automated control mechanisms known in the art. In the illustrated embodiment, when stem 250 is moved to the closed position, obturator 260 is driven (torque seated) against seat rings 220, 230, such that its beveled faces 264, 266 are forced into abutting engagement with corresponding beveled faces 222, 232 of seat rings 220, 230.

In the illustrated embodiment, the wedge shape of obturator 260 is a so called flex gate obturator provided by a pair of spaced apart wedge elements 264A, 266A, separated by a dimensionally smaller mid-section 262. The relatively small dimension of mid-section 262 permits wedge elements 264A, 266A to flex or otherwise move slightly relative to one another when obturator 260 is torque seated to accommodate imperfections in seat rings 220, 230. It is not necessary that valves according to the invention be flex gate valves or that valves according to the invention be torque seated valves. Valves according to other embodiments may generally comprise any torque seated gate valve or position seated gate valve (e.g. a parallel slide position seated gate valve).

Figure 4:
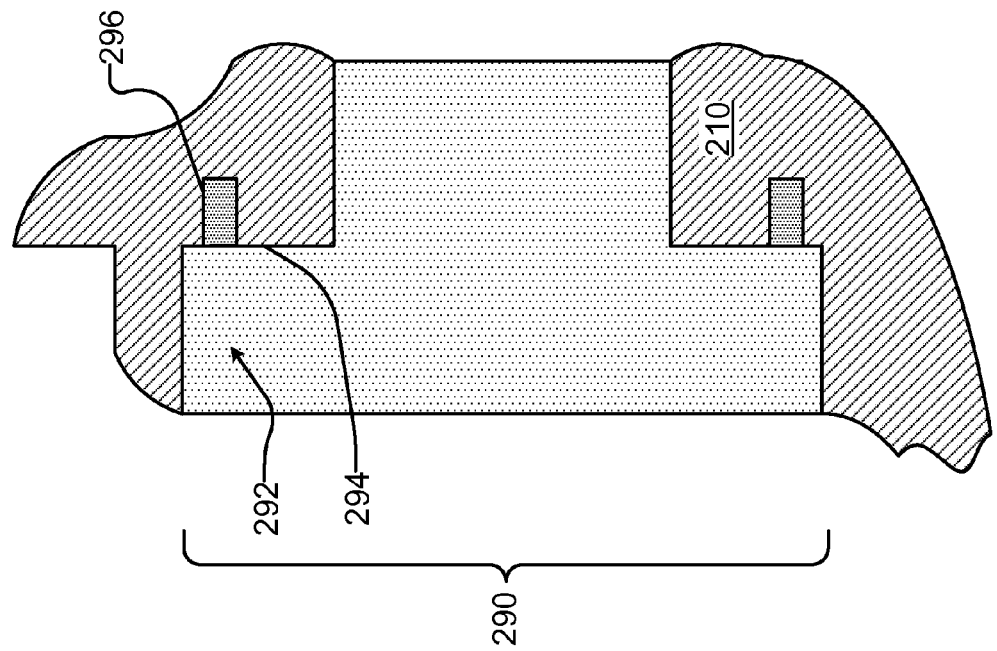
FIG. 4 shows a partial cross-sectional view of a valve body of the FIG. 2 valve.
Figure 3:
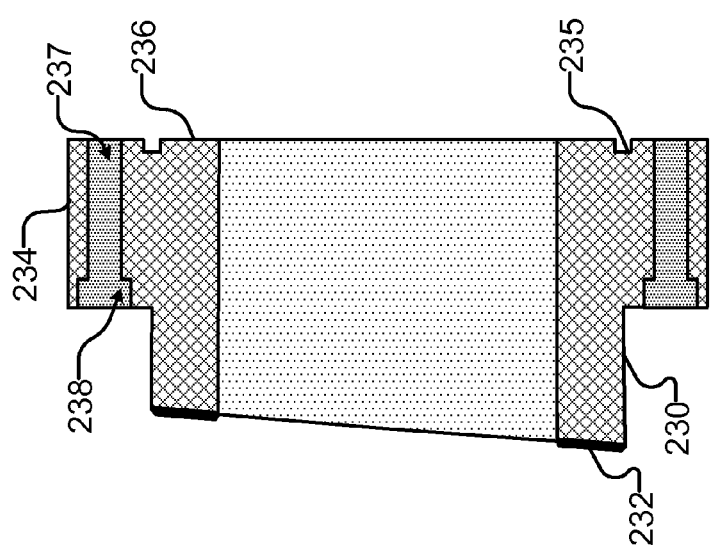
FIG. 3 shows a cross-sectional view of a seat ring of the FIG. 2 valve.

Seat rings 220, 230 are respectively configured (e.g. shaped and/or sized) to fit into seat pockets 280, 290 defined in valve body 210. Seat ring 230 and seat pocket 290 are described in detail below, it being understood that seat ring 220 and seat pocket 280 may be substantially similar (in mirror image) to seat ring 230 and seat pocket 290. Seat ring 230 and seat pocket 290 may be seen best in FIGS. 3 and 4, which respectively show a cross sectional view of seat ring 230 in isolation and a cross-sectional view of a portion of valve body 210 including seat pocket 290 in isolation.

Seat pocket 290 comprises a counterbore 292 terminating in a flat annular shoulder sealing face 294. Seat ring 230 comprises an annular flange 234, the outer diameter of which is sized to fit axially within counterbore 292. Annular flange 234 comprises a flange sealing face 236 on the side of seat ring 230 opposite from sealing face 232. Flange sealing face 236 is configured (e.g. shaped and/or sized) to seal against annular shoulder sealing face 294 of seat pocket 290.

Seat ring 230 is installed and secured in seat pocket 290 using a plurality of fasteners 270 (FIG. 2). A plurality of axial bores 237 may be defined through flange 234. A corresponding plurality of internally threaded recesses 296 may be provided in valve body 210. In the illustrated embodiment, each fastener 270 comprises a threaded shank 272 that extends through a corresponding axial bore 237 of seat ring 230 and into a corresponding recess 296 in valve body 210. In the illustrated embodiment, fasteners 270 comprise bolts having heads 274 which may be engaged using suitable tools. Fasteners 270 force flange sealing face 236 of seat ring 230 into axial engagement with shoulder sealing face 294 of valve body 210. This force is generated by the engagement of shanks 272 of fasteners 270 with threaded recesses 296 of valve body 210 and by the engagement of the bearing surfaces of heads 274 of fasteners 270 with counterbores 238 defined at the entrance of bores 237 of seat ring 230. Fasteners 270, recesses 296 and/or counterbores 238 may be configured to develop sufficient load to bring seat ring 230 to a mechanical stop on valve body 210.

In the illustrated embodiment, fasteners 270 comprise externally threaded fasteners (e.g. bolts) configured to mate with corresponding internally threaded recesses 296 defined in valve body 210 on annular shoulder sealing face 294. In other embodiments, fasteners 270 used to install and secure seat ring 230 in seat pocket 290 may comprise a combination of externally threaded studs sealed into internally threaded recesses 296 of valve body 210 and nuts which may be located in counterbores 238 of seat ring 230 and threadably secured to the opposing ends of the studs.

The illustrated cross-sectional views show only two fasteners 270 and two corresponding bores 237 and recesses 296. However, a greater number (e.g. 24 or more) fasteners 270, bores 237 and recesses 296 may be circumferentially symmetrically arranged around passageway 212. Providing a relatively large number of relatively small fasteners 270 at relatively tight spacing may be advantageous. The relatively small diameter of smaller fasteners 270 means that less torque is required on each fastener to force seat ring 230 into engagement with valve body with sufficient force to establish a seating load which "pre-energizes" metal seal 242 (explained in more detail below). In some applications, dynamically energized metal seal 242 has minimum specified pre-energizing seating load requirements. Such seating load requirements may be expressed in units of force per unit length. Having a relatively large number of relatively small fasteners at relatively tight spacing may help to meet such seating load specifications with relatively low torques on the individual ones of fasteners 270. Also, the seating load provided by a relatively large number of relatively tightly spaced fasteners 270 is more uniform which minimizes or reduces stress regions. Smaller fasteners 270 may also be advantageous because if fasteners 270 experience galling, particularly where valve 200 is being used at high pressures and/or temperatures, then less torque may be required to remove fasteners 270 for servicing and/or replacement of seat rings 220, 230 (explained further below). In some embodiments, the diameter of the shanks 272 of fasteners 270 is less than or equal to ¾". In some embodiments, this diameter is less than ½".

In the illustrated view, fasteners 270, bores 237 and recesses 296 are shown at only one radial distance from a central axis of passageway 212. This is not necessary. In some embodiments, fasteners 270, bores 237 and recesses 296 may be provided at different radial distances from a central axis of passageway 212. Such different radial distances may be both radially inside and radially outside of grooves 235 and metal seal 242 (explained in more detail below). Fasteners 270, bores 237 and recesses 296 may be arranged in a pattern that determines the orientation of seat ring 230 in seat pocket 290. In some embodiments, valve body 210 and/or seat ring 230 may comprise one or more alignment pins or projections which fit into corresponding alignment recesses in the other one of valve body 210 and/or seat ring 230 to ensure the orientation of seat ring 230 in seat pocket 290.

The threads of fasteners 270 and/or threaded recesses 296 may plated, such as with gold, silver or the like. Such coating may inhibit oxidation and may also reduce galling of the threads of fasteners 270 and recesses 296 of valve body 210. Having relatively small fasteners 270 may make it relatively inexpensive to coat the threads of fasteners 270 with such materials.

Figure 5:
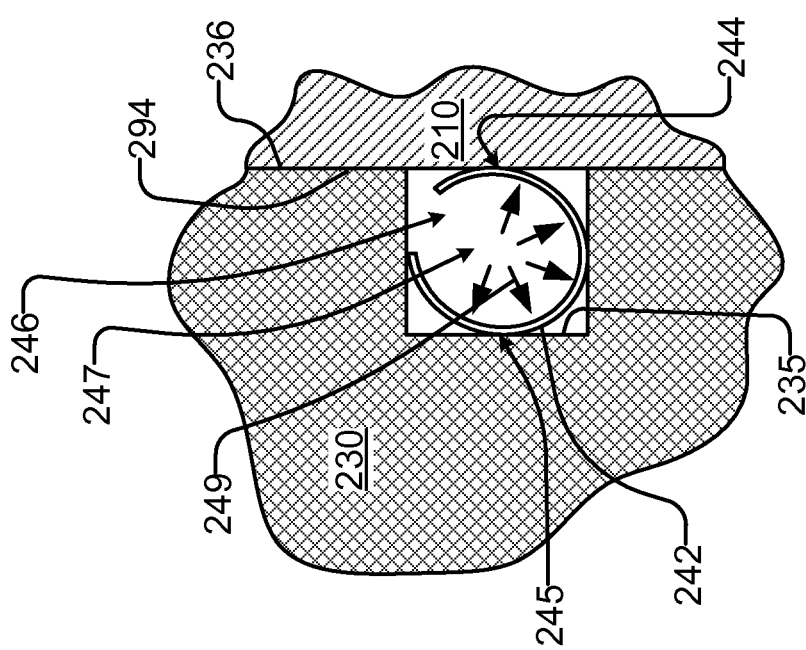
FIG. 5 shows a partial cross-sectional view of a portion of the FIG. 2 valve incorporating a metal seal which has been pre-energized by the application of a seating load.

FIG. 5 shows a cross-sectional view of seat ring 230 and valve body 210 with detail of the interface between flange sealing face 236 of seat ring 230 and shoulder sealing face 294 of valve body 210. The view shown in FIG. 5 corresponds to area 5 shown in dashed outline in FIG. 2. Valve 210 comprises a dynamically-energized metal seal 242 between seat ring 230 and valve body 210. Dynamically-energized metal seals are characterized in that they may be "pre-energized" by a seating load (typically provided by mating surfaces) which causes some initial deformation of the seal. This pre-energizing initial deformation may comprise both plastic (permanent) and elastic (resilient) deformation of the seal. Once pre-energized in this manner, a dynamically-energized seal "springs back" (i.e. elastically expands from its initially deformed state) under the influence process pressure (e.g. pressure from the fluid(s) being sealed in valve 200) to thereby maintain contact between the seal and the mating surfaces which provide the seating load.

Figure 6:
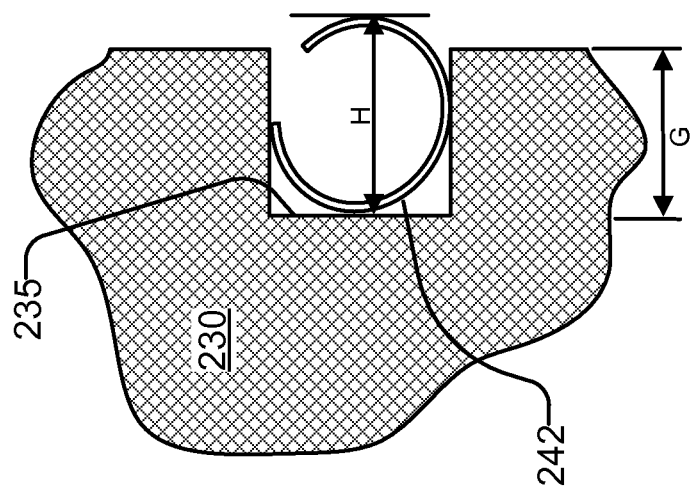
FIG. 6 shows a partial cross-sectional view of a portion of the seat ring and the metal seal of the FIG. 2 valve prior to application of the seating load.

FIG. 6 is a cross-sectional view showing seat ring 230 and dynamically-energized metal seal 242 prior to pre-energizing of seal 242. An annular groove 235 is defined on annular flange sealing face 236 of seat ring 230. Annular shaped seal 242 is fitted into groove 235 prior to installing seat ring 230 into seat pocket 290 of valve body 210. In the particular case of the illustrated embodiment shown in FIGS. 5 and 6, dynamically-energized metal seal 242 comprises a pressure-energized metal seal having a generally C-shaped cross-section. Pressure-energized metal seals represent a subset of dynamically-energized metal seals where the process pressure may increase the sealing forces associated with spring back of the seals. In other embodiments, seal 242 may comprise another type of dynamically energized seal including other types of pressure-energized metal seals.

Seal 242 and groove 235 are configured (e.g. sized and/or shaped) so that seal 242 is subjected to, and pre-energized by, a desired seating load when seat ring 230 is secured in seat pocket 290 of valve body 210. Prior to being subjected to the seating load, seal 242 has a free dimension H greater than a depth G of groove 235 (FIG. 6). As fasteners 270 draw seat ring 230 toward and into contract with annular shoulder sealing face 294, seal 242 is pre-energized (e.g. via plastic and elastic compression) in groove 235. In the illustrated embodiment, seal 242 is maximally compressed when flange sealing face 236 of seat ring 230 reaches a mechanical stop on annular shoulder sealing face 294 of valve body (FIG. 5). Loads developed by fasteners 270 in excess of the load required to bring flange sealing face 236 of seat ring 230 to a mechanical stop on shoulder sealing face 294 of valve body 210 may be borne by seat ring 230 and/or fasteners 270 and may not increase the seating load on seal 242. The seating load created by securing seat ring 230 in seat pocket 290 of valve body 210 may be significantly less than the load requirements of conventional flat gaskets. This reduced load associated with dynamically-energized metal seal 242 (in comparison to the load associated with a conventional flat gasket) can reduce the torque requirements for fasteners 270, allowing the use of relatively small fasteners 270. As discussed above, relatively small fasteners 270 are advantageous because if they experience galling (e.g. where valve 200 is being used at high pressures and/or temperatures), fasteners 270 can be removed with relatively small torques.

When subjected to a seating load in this manner, seal 242 exerts a reaction load and may produce a corresponding contact stress over a first annular contact area 244 between seal 242 and annular shoulder sealing face 294 of valve body 210 and over a second annular contact area 245 between seal 242 and one or more surfaces of groove 235 of seat ring 230. Because annular contact areas 244, 245 are relatively small in comparison with the contact area between flange sealing face 236 of seat ring 230 and shoulder sealing face 294 of valve body 210, the force per unit area of annular contact areas 244, 245 is relatively large in comparison with the contact force per unit area of the contact area between sealing faces 236, 294. As a result, relative large contact stresses may be generated over contact areas 244, 245. As discussed above, some metal seals 242 have minimum specified seating loads which are typically expressed in units of force per unit length. The relatively large contact stresses generated over contact areas 244, 245 may achieve these minimum specified seating loads with relatively little force between sealing faces 236, 294.

Groove 235 and metal seal 242 may be configured so that metal seal 242 is pre-tensioned or partially pre-tensioned by contact forces from one or both sidewalls of groove 235.

When valve 200 is in use (particularly for high pressure applications), process pressure may act against the seating load, effectively reducing the seating load experienced by seal 242. Reduction of the seating load experienced by seal 242 causes dynamically-energized seal 242 to "spring back" (e.g. elastically expand) and to thereby maintain the seal between flange sealing face 236 of seat ring 230 and shoulder sealing face 294 of valve body 210. In some cases, pressurized operating fluid from flow passageway 212 (not shown in FIG. 5) may travel between sealing faces 236 and 294 to reach groove 235. In the particular case of the C-shaped metal seal 242 of the FIG. 5 embodiment, such pressurized operating fluid may enter gap 246 between the ends of seal 242 and into an interior 247 of seal 242. Pressurized operating fluid in the interior 247 of seal 242 may exert outward process forces (shown by arrows 249) on seal 242. Such outward process forces 249 may tend to increase the "spring back" (elastic expansion) of seal 242, resulting in greater contact stress at contact areas 244, 245 and correspondingly increased sealing effectiveness of metal seal 242 between valve body 210 and seat ring 230.

Dynamically-energized metal seals (of which seal 242 is an example) typically require less seating load to deliver the same sealing performance as seals energized exclusively by seating loads. Accordingly, use of dynamically-energized metal seals requires correspondingly less force to be asserted by fasteners 270 to connect seat ring 230 to valve body 210. Advantageously, fasteners 270 required to assert less force may be smaller, more easily installed, less prone to failure, less prone to galling within a high pressure valve and/or less expensive than fasteners required to assert more force.

In particular embodiments, dynamically-energized metal seals (of which seal 242 is an example) may have free heights on the order of 0.04-1.0 inches. In particular embodiments, dynamically-energized metal seals may have springback ranges on the order of 0.01-0.5 inches. In particular embodiments, the seating loads for dynamically energize metal seals may be over 1,000 lbs/inch. In some embodiments such seating loads may be over 1,500 lbs/inch/

FIGS. 7-10 show partial cross-sectional views of valves according to other example embodiments which are similar to valve 200, but which differ in the type and/or configuration of the dynamically energized metal seal fitted in groove 235. For convenience, the reference numbers used to identify features of valve 200 are use to identify similar features of the valves shown in FIGS. 7-10.

Figure 7:
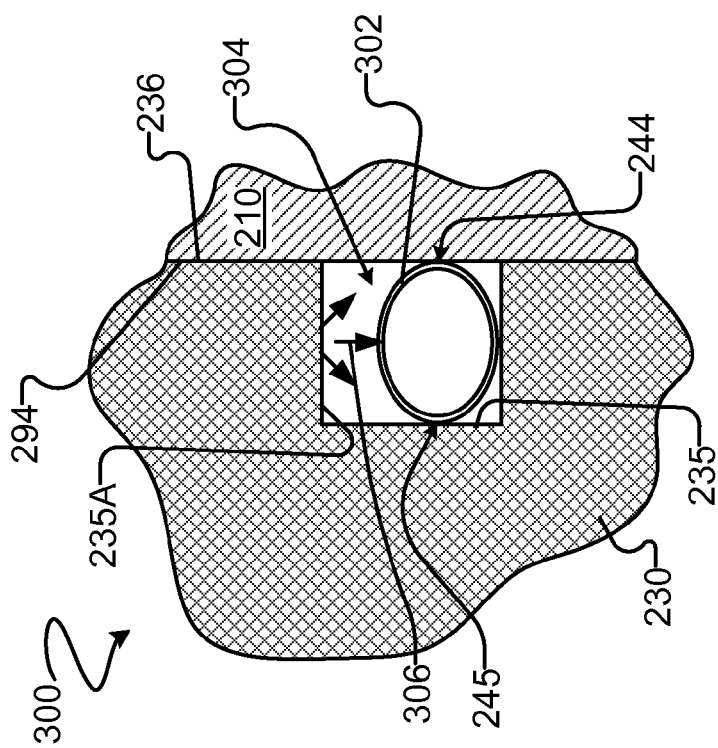

FIG. 7 shows a partial cross-sectional view of a valve 300 according to an example embodiment comprising seat ring 230 and valve body 210 with detail of the interface between sealing faces 236, 294. Valve 300 of the FIG. 7 embodiment, comprises a dynamically-energized metal seal 302 having a generally annular cross-section. Like seal 242 described above, process pressure within valve 300 may effectively reduce the seating load on seal 302 and cause dynamically-energized seal 302 to "spring back" (e.g. elastically expand) to thereby maintain the seal between seat ring 230 and valve body 210. Process pressure may also cause pressurized fluid to enter region 304 of groove 235 which may in turn exert process forces (shown by arrows 306). Such process forces 306 may tend to increase the "spring back" (elastic expansion) of seal 302, resulting in greater contact stress at contact areas 244, 245 and correspondingly increased sealing effectiveness of metal seal 302 between valve body 210 and seat ring 230.

Figure 8:
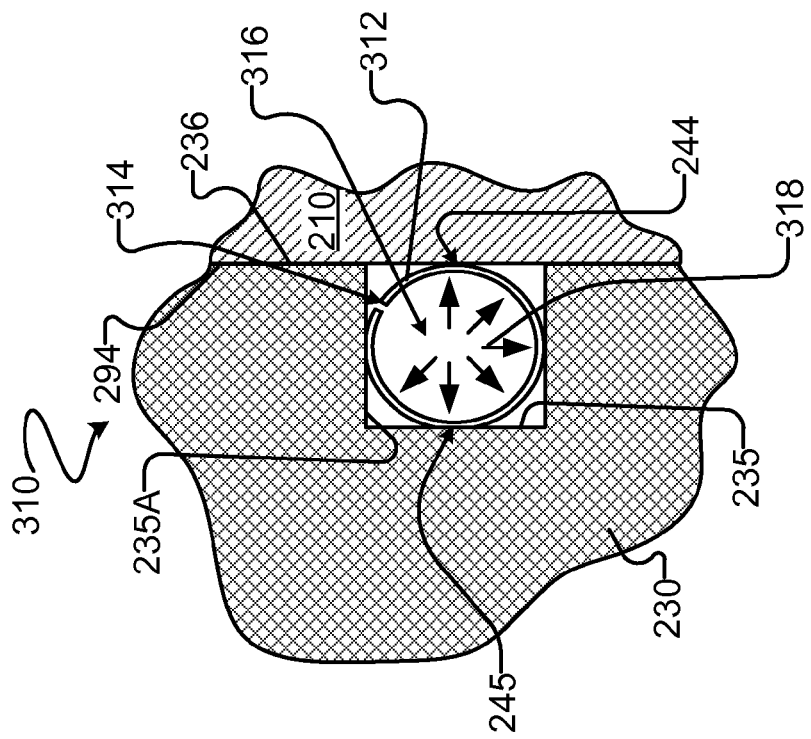

FIG. 8 shows a partial cross-sectional view of a valve 310 according to an example embodiment comprising seat ring 230 and valve body 210 with detail of the interface between sealing faces 236, 294. Valve 310 of the FIG. 8 embodiment, comprises a dynamically energized vented metal seal 312 which has a generally annular cross-section but which is perforated by one or more perforations 314. Such perforations 314 (only one of which is shown in the FIG. 8 view) may be defined in metal seal 312 at locations between contact faces 244, 245 and flow passageway 212 (not shown in FIG. 8). Like seal 242 described above, process pressure within valve 310 may effectively reduce the seating load on seal 312 causing dynamically-energized seal 312 to "spring back" (e.g. elastically expand) to thereby maintain the seal between seat ring 230 and valve body 210. Pressurized operating fluid from flow passageway 212 may also enter an interior 316 of seal 312 through perforations 314. Pressurized operating fluid in the interior 316 of seal 312 may exert outward process forces (shown by arrows 318) on seal 312. Such outward process forces 318 may tend to increase the "spring back" (elastic expansion) of seal 312, resulting in greater contact stress at contact areas 244, 245 and correspondingly increased sealing effectiveness of metal seal 312 between valve body 210 and seat ring 230.

FIG. 9 shows a partial cross-sectional view of a valve 320 according to an example embodiment comprising seat ring 230 and valve body 210 with detail of the interface between sealing faces 236, 294. Valve 320 of the FIG. 9 embodiment, comprises a dynamically energized metal seal 322 having a E-shaped cross-section. Like seal 242 described above, process pressure within valve 320 may effectively reduce the seating load on seal 322 causing dynamically-energized seal 322 to "spring back" (e.g. elastically expand) to thereby maintain the seal between seat ring 230 and valve body 210. Pressurized operating fluid from flow passageway 212 may also enter region 324 of groove 235 and may exert outward process forces (shown by arrows 326) on seal 322. Such outward process forces 326 may tend to increase the "spring back" (elastic expansion) of seal 322, resulting in greater contact stress at contact areas 244, 245 and correspondingly increased sealing effectiveness of metal seal 322 between valve body 210 and seat ring 230.

FIG. 10 shows a partial cross-sectional view of a valve 330 according to an example embodiment comprising seat ring 230 and valve body 210 with detail of the interface between sealing faces 236, 294. Valve 330 of the FIG. 10 embodiment, comprises a dynamically energized metal seal 332 comprising a C-shaped sealing ring 334 with an internal spring element 336. Spring element 336 may comprise a helical shaped spring element. Like seal 242 described above, process pressure within valve 330 may effectively reduce the seating load on seal 332 causing dynamically-energized seal 332 to "spring back" (e.g. elastically expand) to thereby maintain the seal between seat ring 230 and valve body 210. The C-shaped sealing ring 334 of seal 332 may act in a manner similar to seal 242 described above in that pressurized operating fluid from flow passageway 212 may enter an interior of C-shaped sealing ring 334 and exert outward process forces (similar to process forces 249) which help to increase the sealing effectiveness of seal 332. Pressurized operating fluid from flow passageway 212 may also enter region 338 of groove 235 and may exert process forces (shown by arrows 340) on internal spring element 336. Such process forces 340 may cause spring element 336 to exert corresponding spring forces (shown by arrows 342) which tend to increase the "spring back" (elastic expansion) of seal 332, resulting in greater contact stress at contact areas 244, 245 and correspondingly increased sealing effectiveness of metal seal 332 between valve body 210 and seat ring 230.

FIGS. 5-10 show dynamically-energized metal seals according to a number of particular embodiments. In other embodiments, other forms of dynamically-energized metal seals may be used. Non-limiting examples of dynamically-energized metal seals that may be used in various embodiments include:

Spring-energized O-ring internal pressure face seals
Wire-ring pressure face seals;
Suncup internal pressure face seals;
V-Ring internal pressure face seals;
U-Ring internal pressure face seals;
Other E-seals, C-seals, O-ring seals, spring-energized seals, vented seals; and/or
the like.

Dynamically-energized metal seals may be formed of materials capable of withstanding greater temperatures and pressures than elastomer seals. As a result, valves according to embodiments disclose herein may be useful in applications where temperature and/or pressure precludes the use of elastomer seals (e.g. in applications where seat rings are secured in valve bodies by welding or by threaded connection between seat ring and valve body).

Dynamically-energized metal seals described herein may comprise (e.g. be formed of) metallic and/or composite materials. In some embodiments, metal seals comprise austenitic nickel-chromium-based alloy (e.g. an alloy selected from the Inconel™ family of alloys produced by Special Metal Corporation, the Hastalloy™ family of alloys produced by Haynes International, Inc., the Waspalloy™ family of alloys produced by United Technology Corp., the Rene family of alloys produced by General Electric and/or the like).

Figure 11:
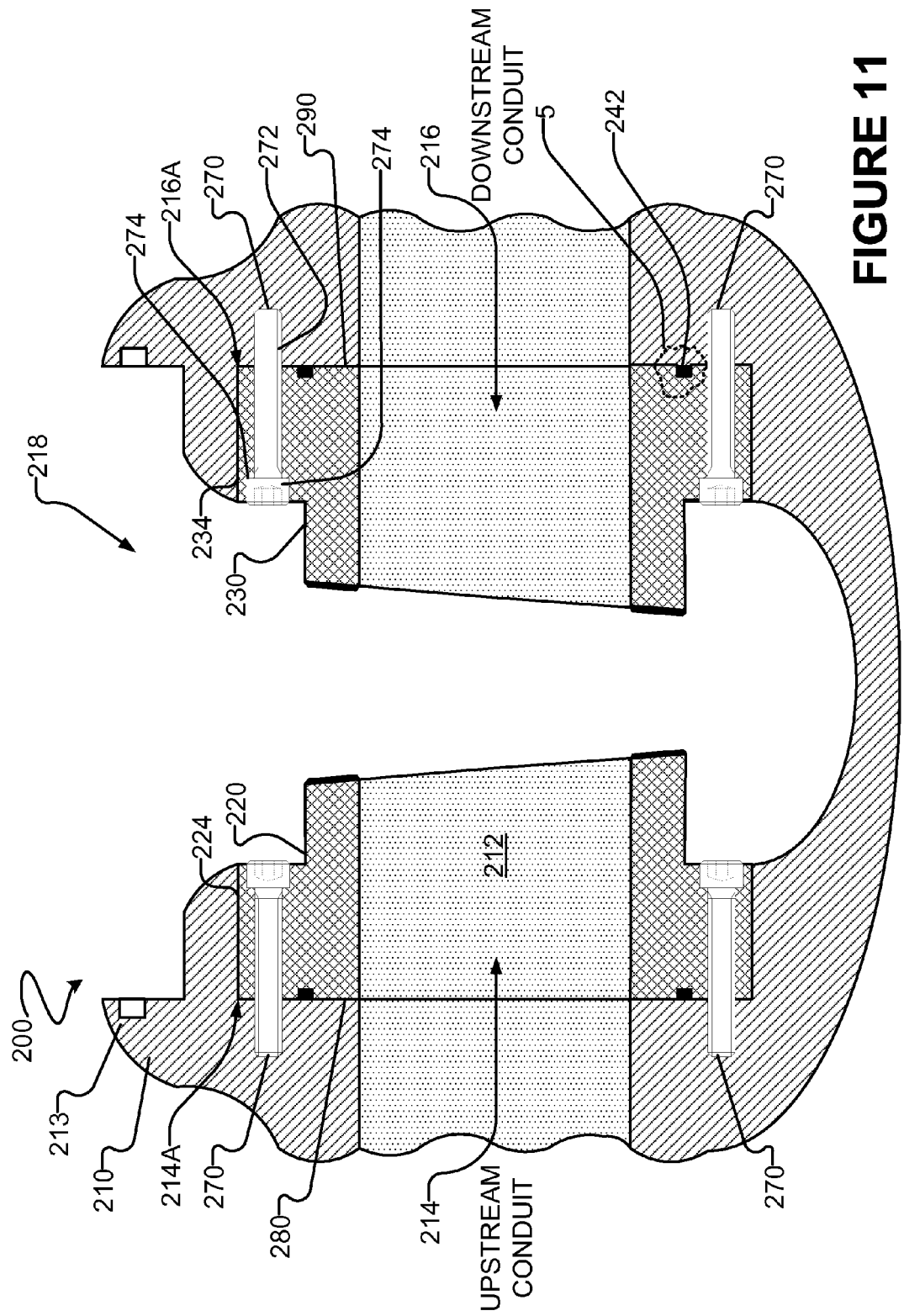
FIG. 11 shows a partial cross-sectional view of the FIG. 2 gate valve in the process of removing and/or installing seat rings.

FIG. 11 schematically illustrates the installation and/or removal of seat rings 220, 230 from valve 200 (e.g. when it is desired to service and/or replace seat rings 220, 230). Bonnet 240 and optionally seals 241 are removed from valve 200 to expose access aperture 218. Obturator 260 and stem 250 may also be removed as shown in FIG. 11. Once these elements are removed, a suitable tool have a 90° elbow may be extended through access aperture 218 to remove fasteners 270. As discussed above, fasteners 270 may be tightened with relatively low torque and may be relatively less susceptible to galling, making it relatively easy to loosen and remove fasteners 270. Once fasteners 270 are removed from one of seat rings 220, 230, then that seat ring 220, 230 can be extracted through access aperture 218. The other one of seat rings 220, 230 can then be extracted in a similar manner. Installing replacement seat rings 220, 230 may comprise a reversal of the steps involved in removing seat rings 220, 230, except that there may be a desired order of tightening fasteners 270 to achieve a uniform seal.

As will be apparent to those skilled in the art in light of the foregoing disclosure, many alterations and modifications are possible in the practice of this invention without departing from the spirit or scope thereof. For example:

The above-described embodiments are wedge-gate valves which represent an example of a torque seated valve. This is not necessary. Embodiments of the invention may comprise other types of torque seated valves, parallel slide valves, other types of position seated valves and/or the like. In still other embodiments, valves other than gate valves may be provided—e.g. Y-globe valves, tilting disc check valves, swing check valves, and/or the like.

In other embodiments, groove 235 may be defined at the periphery of annular face 234 of seat ring 230 and metal seal 242 operated in counterbore mode.

In the illustrated embodiments, metal seals 242 are located closer to valve passageway 212 than fasteners 270, but this is not necessary. In some embodiments, fasteners are located closer to valve passageway 212 than metal seals 242.

While a number of exemplary features and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true scope.

What is claimed is:

1. A method for installing an annular seat ring into the body of a gate valve, the method comprising:
    providing a valve body having a seat pocket, the seat pocket having an annular shoulder sealing face and a plurality of recesses defined at the seat pocket;
    providing an annular seat ring comprising an annular seat face and an opposed annular flange sealing face and a plurality of recesses defined in the flange sealing face corresponding to and alignable with the plurality of recesses defined at the seat pocket;
    locating a dynamically-energized seal in an annular groove, the annular groove provided in one of: the flange sealing face and the shoulder sealing face;
    connecting a plurality of removable fasteners between the valve body and the seat ring, the fasteners located in the plurality of recesses in the seat pocket and the flange sealing face, to bring the flange sealing face of the seat ring to a mechanical stop on the shoulder sealing face of the seat pocket and to thereby provide a seating load which plastically and elastically compresses the dynamically-energized seal.

2. A method for replacing an annular seat ring in the body of a gate valve, the method comprising:
    removing a bonnet from the gate valve;
    removing an obturator from the gate valve through an aperture exposed by removing the bonnet;
    removing a plurality of fasteners from in a plurality of recesses defined at a seat pocket in the annular seat ring, the plurality of fasteners connecting the annular seat ring to a plurality of recesses defined in a flange sealing face of a gate valve body corresponding to and alignable with the plurality of recesses defined at the seat pocket and the annular seat ring made accessible by the removal of the bonnet and the obturator;

extracting the annular seat ring from a seat ring location in the gate valve through the aperture removing a dynamically-energized seal from between the annular seat and the gate valve body and replacing the dynamically-energized seal with a replacement dynamically-energized seal by locating the replacement dynamically-energized seal in an annular groove provided in one of the annular seat ring and the valve body;

locating a replacement seat ring at the seat ring location;

connecting a plurality of replacement fasteners to the replacement seat ring;

providing a seating load which plastically and elastically compresses the replacement dynamically-energized seal; and installing the obturator and bonnet in the gate valve.

3. A method according to claim 2 wherein the gate valve is maintained in an operating location throughout each step of the method.

4. A method according to claim 2 wherein the plurality of fasteners and the plurality of replacement fasteners are the same.

5. A gate valve for controlling flow of pressurized operating fluid, the gate valve comprising:
a valve body having a seat pocket, the seat pocket having an annular shoulder sealing face and a plurality of recesses defined at the seat pocket;
an annular seat ring comprising an annular seat face opposing an annular flange sealing face, the flange sealing face having an annular groove defined thereon and a plurality of recesses defined in the flange sealing face corresponding to and alignable with the plurality of recesses defined at the seat pocket;
a plurality of fasteners connectable between the valve body and the seat ring located in the plurality of recesses in the seat pocket and the flange sealing face and configured to bring the flange sealing face of the seat ring to a mechanical stop on the shoulder sealing face of the seat pocket; and
a dynamically-energized seal located in the annular groove, the dynamically-energized seal plastically and elastically compressible by a seating load between the seat ring and the valve body when the flange sealing face of the seat ring has reached a mechanical stop on the shoulder sealing face of the seat pocket.

6. A gate valve according to claim 5 wherein the dynamically-energized seal is elastically expandable under process pressure exerted by the pressurized operating fluid.

7. A gate valve according to claim 5 wherein the dynamically-energized seal has a free height greater than a depth of the annular groove.

8. A gate valve according to claim 5 wherein the flange sealing face is defined on an annular sealing flange.

9. A gate valve according to claim 8 wherein the plurality of recesses defined at the seat pocket are internally threaded, and the plurality of recesses defined in the sealing flange are a plurality of axial bores.

10. A gate valve according to claim 9 wherein the plurality of fasteners comprise externally threaded fasteners mateable with the plurality of internally threaded recesses.

11. A gate valve according to claim 5 wherein the seat pocket is located at an inlet port.

12. A gate valve according to claim 5 wherein the seat pocket is located at an outlet port.

13. A gate valve according to claim 5 wherein the dynamically-energized seal comprises a generally annular cross-section.

14. A gate valve according to claim 5 wherein the dynamically-energized seal comprises a generally C-shaped cross-section.

15. A gate valve according to claim 5 wherein the dynamically-energized seal comprises an E-shaped cross-section.

16. A gate valve according to claim 5 wherein the dynamically-energized seal comprises a vented seal.

17. A gate valve according to claim 16 wherein the vented seal comprises perforations for allowing pressurized operating fluid to flow through the perforations.

18. A gate valve according to claim 17 wherein the perforations are configured to allow pressurized operating fluid from an outside of the seal into an interior of the seal, thereby energizing the seal internally.

19. A gate valve according to claim 5 wherein the dynamically-energized seal comprises a spring-energized seal.

20. A gate valve according to claim 19 wherein the spring-energized seal comprises a C-shaped sealing ring and an internal spring.

21. A gate valve according to claim 5 wherein the annular groove is defined inside a periphery of the flange sealing face of the seat ring.

22. A gate valve according to claim 5 wherein the annular groove comprises a notch defined at or outside of the periphery of the flange sealing face of the seat ring.

23. A gate valve according to claim 5 wherein the plurality of fasteners have a diameter of less than ¾ of an inch.

24. A gate valve according to claim 23 wherein the plurality of fasteners have a diameter of less than ½ of an inch.

25. A gate valve according to claim 24 wherein the plurality of fasteners comprise at least 24 fasteners.

* * * * *